Figure 1:
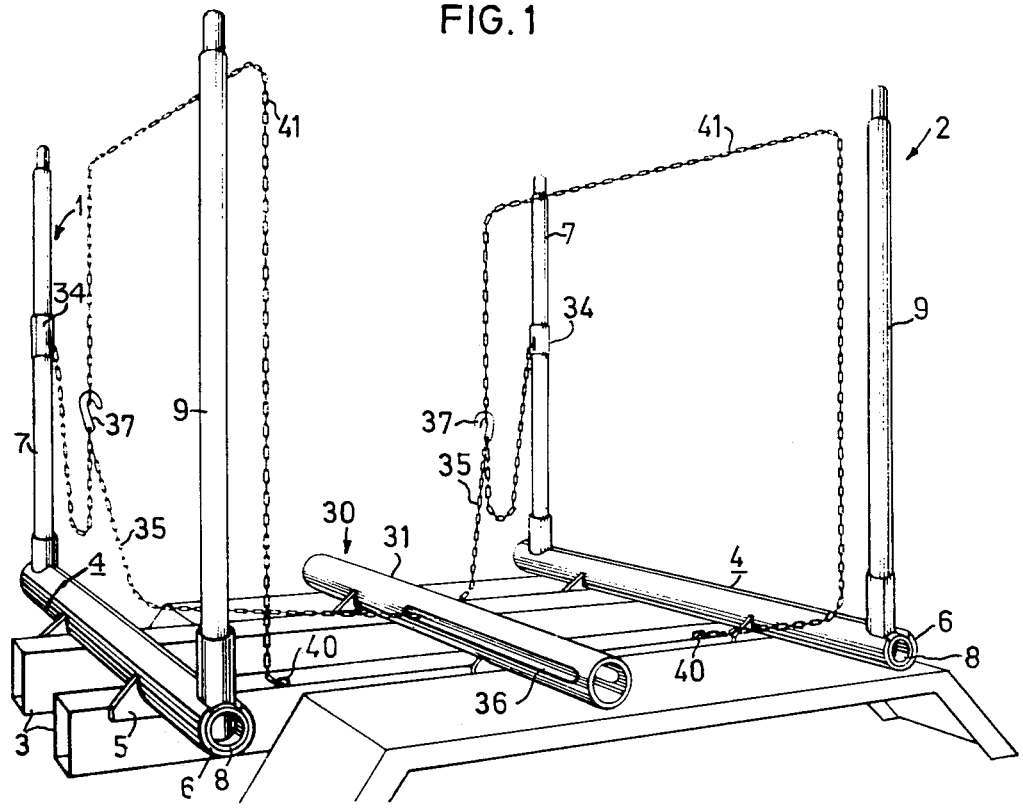

United States Patent [19]

Nordin

[11] 4,193,730
[45] Mar. 18, 1980

[54] DEVICE FOR TRANSPORT AND UNLOADING OF STACKED LOGS

[76] Inventor: Bengt A. Nordin, S-880 52 Hoting, Sweden

[21] Appl. No.: 920,996

[22] Filed: Jun. 30, 1978

[51] Int. Cl.² ............................................. B60P 1/48
[52] U.S. Cl. .................................. 414/537; 280/145; 410/37
[58] Field of Search ............... 414/506, 537, 538, 539, 414/507, 509, 480, 467; 280/143, 144–148, 179 R, 179 A

[56] References Cited

U.S. PATENT DOCUMENTS

| | | | |
|---|---|---|---|
| 2,773,700 | 12/1956 | Lasswell | 280/179 A |
| 3,549,030 | 12/1970 | Coughran, Jr. et al. | 414/539 |

*Primary Examiner*—Albert J. Makay

*Attorney, Agent, or Firm*—Haseltine, Lake & Waters

[57] ABSTRACT

A device for transport and unloading of e.g. logs stacked on a support such as a timber truck provided with at least two timber bunks, each consisting of a transverse member carrying said logs, said member having a vertical stake at each end. The stakes on one side of the support are stationary in their upright position, while the opposite stakes can move from the stationary stakes and swing to a downwardly inclined position by telescopic extension of said transverse member for unloading. The timber bunks are combined with an intermediate member for unloading by elongate flexible members being tensioned to form an inclined unloading ramp. Two auxiliary elongate flexible members, attached to said first flexible members while encircling the load, can be stretched by partial tensioning of said first flexible members.

9 Claims, 3 Drawing Figures

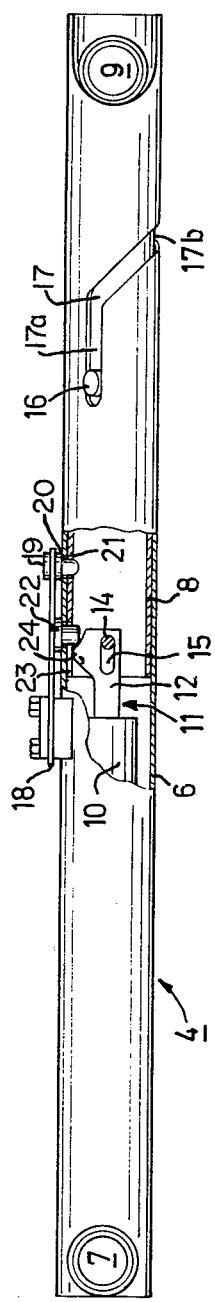
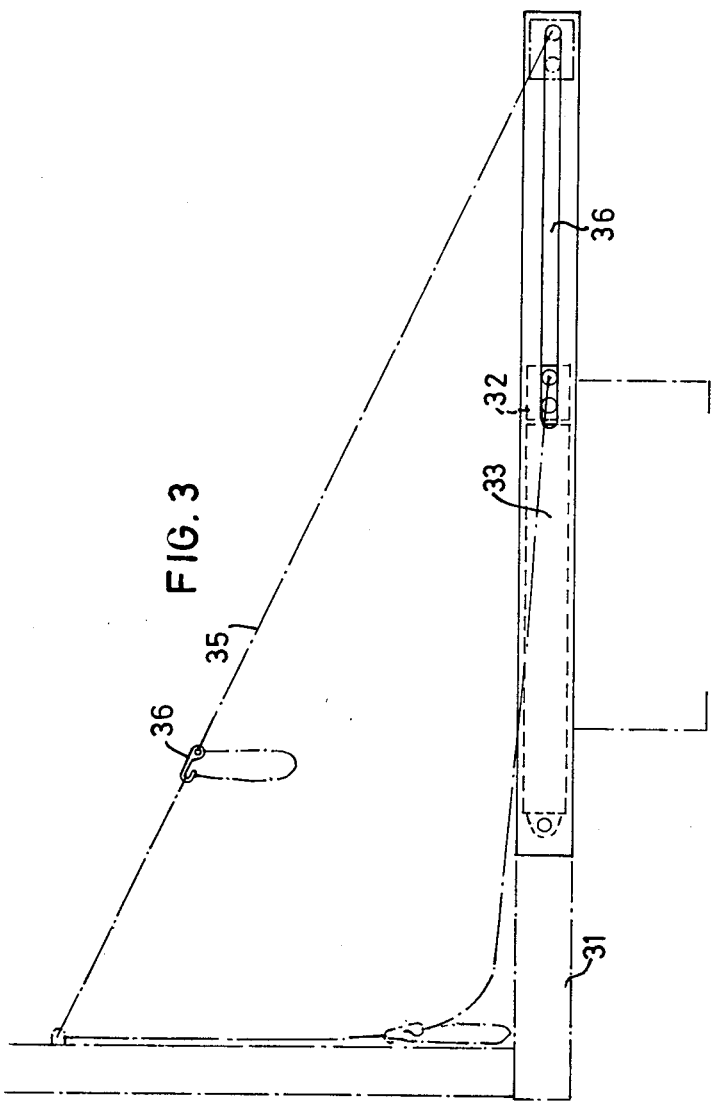

DEVICE FOR TRANSPORT AND UNLOADING OF STACKED LOGS

The present invention relates to a device for transporting logs and similar elongate objects stacked on a support, for instance a timber bunk, and for unloading said logs.

It is common practice to transport logs, stacked on so-called timber bunks arranged in spaced relationship on the chassis of a timber truck and extending transversely thereto. A timber bunk usually includes a first and a second stake, arranged in a vertical upstanding position on each side of the stacked logs, for retaining the logs therebetween, the bottom ends of said stakes being interconnected by means of a transverse member on which said logs rest. When the logs are to be unloaded from the truck, the stakes on one side of the logs are removed whereafter the logs are allowed to roll and fall off the timber bunks.

The stakes may be removed in several different manners. By the oldest and still generally practiced manner, the stakes are manually lifted out of the corresponding transverse member. According to another known embodiment, one or both stakes of a timber bunk are held in a vertical position in a recess in said transverse member which is provided with mechanisms, such as an eccentric mechanism, for pushing the stake out of said recess, whereafter the stake can be manually swung down around the axis of its transverse member into a downwardly sloping position. Both said devices are dangerous, since manual handling of the stakes must be carried out from the side of the truck, where the logs are to be unloaded.

It is also known to construct the stakes in such a manner that they may be swung down in a plane perpendicular to the axis of the truck and form ramps along which the logs can be unloaded. The stakes must then be very rigid and heavy to withstand the stresses during unloading, and the logs must be unloaded to a level situated a relatively great distance below the transport level.

The main object of the present invention is to provide a device of the kind mentioned, which to a great extent can be remotely actuated from the driver's seat of the truck, and by which the necessary manual operation of the device is performed from the side of the truck, opposite the unloading side. Thereby all risks of injury to the operators are eliminated.

This object is achieved by means of a device comprising (a) at least two timber bunks secured to said support transversely to the same and longitudinally spaced from each other, each of said timber bunks including a first and a second vertical upstanding stake for retaining said stacked logs and a transverse member interconnecting the bottom ends of said stakes, said transverse member being telescopically extendable to move said second stake away from said first stake and simultaneously swing said second stake from its vertically upstanding position to a downwardly inclined position;

(b) a second transverse member secured to said support intermediate said timber bunk and parallel thereto, said second transverse member being extendable in the same direction as the transverse member of said timber bunk, one end of an elongate flexible member being anchored to each of said first stakes at a distance upwards from said support and the other end thereof being connected to said second transverse member for a substantially horizontal movement upon extension and retraction thereof, said flexible member having such length loosely as to extend in loose condition, from said first end downwardly along and beneath said stacked logs when said second transverse member is retracted, and to extend in a tightened condition between said ends when said second transverse member is extended, thereby forming a sloping ramp for the unloading of said logs from said support; and (c) connecting means provided on said support adjacent and inside the extendable ends of each timber bunk for releasably securing one end of the second elongate flexible member which extends therefrom upwardly over said stacked logs having its other end releasably coupled to a corresponding one of said first flexible members intermediate the ends thereof, so that said second flexible members can be tightened around said stacked logs by partial extension of said second transverse member.

A preferred embodiment of the device according to the invention will be described in detail below with reference to the attached schematical drawings wherein FIG. 1 is an isometric view shows the device according to the invention mounted on a partially shown truck, FIG. 2 is a plan view of one of the timber bunks, partly in section, and FIG. 3 is a sideview of the device for unloading the logs.

Two timber bunks 1 and 2 are secured to the longitudinal beams 3 of a truck chassis. The timber bunks 1 and 2 extend transversely of said beams 3 and are spaced from each other in the longitudinal direction thereof.

Each timber bunk comprises a transverse member 4 which is secured to the beams 3, for instance by means of cradle plates 5 welded to the beams 3 and the transverse member 4. The transverse member 4 consists of an outer circular tube 6 of such length that it bridges over the whole width of the truck. At one end, said outer tube 6 is provided with a stake 7 extending perpendicular to said tube 6 in a vertical upstanding position. An inner circular tube 8 is guided for relative axial and rotational movement in said outer tube 6. At the end facing away from the first-mentioned stake 7, said inner tube 8 is provided with a second stake 9 forming a right angle with said inner tube 8. By means to be described below said axial and rotational movement of said inner tube 8 is so guided that the second stake 9, in the retracted position of said inner tube 8, occupies a vertically upstanding position. Upon extension of the inner tube 8 relative to the fixed outer tube 6 said inner tube 8 is first axially displaced without rotation, so that said second stake 9 moves away from the first stake 7 while maintaining its upright position. Upon continued extension of said inner tube 8, the same is not only axially displaced but also rotated, so that said second stake 9 moves further away from said stake 7 and is also swung around the axis of said outer tube 6 away from the other timber bunk into a downwardly sloping position.

The stakes 7 of the timber bunks 1 and 2 on one side of the truck are therefore stationary in vertically upstanding positions, while the sakes 9 on the opposite side of the truck can be moved away from said stationary stakes 7 and can also be swung from the vertically upstanding transport position to a downwardly sloping unloading position.

The means for actuating the timber bunks 1 and 2 will now be described while referring to FIG. 2. One portion of a linear prime mover, for instance the cylinder 10 of a hydraulic jack 11, is secured inside the outer tube 6 adjacent the end thereof having the stake 7. The other portion of the prime mover, i.e. the piston rod 12 of the jack 11, is connected to the inner tube 8 by a transverse pin 14 in the same and an axially elongated slot 15 at the end of said piston rod 12.

Said inner tube 8 is provided with a radially protruding stud or peg 16 guided in a slot 18 in the wall of the outer tube 6. Said slot 17 has an inner, axially extending portion 17a and an outer, helical portion 17b which extends through more than 90° but less than 180° around the periphery of said outer tube 6. When the hydraulic jack 11 is extended from its fully retracted position as shown in FIG. 2, the piston rod 12 thereof pushes the inner tube 8 axially outwards relative to the outer tube 6, whereby said radial stud 16 passes along the axial portion 17a of said axial slot 17 and thereby restrains the motion of the inner tube 8 to a purely axial displacement. When said stud 16 reaches the helical portion 17b of said slot 17, a rotational movement is superimposed upon the axial displacement of the inner tube 8 so that the stake 9 is swung down as described above.

Each timber bunk 1 and 2 is also provided with a device for locking the inner tube 8 to the outer tube 6 in the retracted condition. Said locking device comprises a leaf spring 18 which extends axially of said outer tube 6 and whose inner end is bolted to the outer surface of said inner tube 6. At the free end, said leaf spring 18 is provided with a latch bolt 19 which is insertable into openings 20 and 21 of said outer and inner tubes 6 and 8, respectively, when said openings 20 and 21 are aligned in the fully retracted position of said inner tube 8. A release bolt 22 is arranged in an opening in the outer tube 6 between the bolted end of said leaf spring 18 and the first-mentioned opening 20 of said outer tube 6. Said release bolt 22 is provided with a head by means of which it is retained in position between the tube wall and the leaf spring 18. The inner end of said release bolt 22 extends into an axial slot 23 in the wall of said inner tube 8, which slot is open at the inner edge of the inner tube 8 and has substantially the same length as said axial portion 17a of the slot 17. The free end of the piston rod 12 is furthermore provided with a laterally protruding cam surface 24 which, in the fully retracted position of the jack 11, is situated outside of but axially aligned with the slot 23 of the inner tube 8. During the initial part of its extension, the piston rod 12 does not displace the inner tube 8 due to the lost motion caused by the slot and pin connection 14, 15 but the cam surface is passed into the axial slot 23 and pushes the release bolt 22 radially outwards so that said leaf spring 18 is bent outwards and lifts the latch bolt 19 out of the aligned openings 20 and 21. Continued extension of the piston rod 12 causes the already described movement of the inner tube 8 and its stake 9. The piston and piston rod 12 are rotationally accommodated in said cylinder to facilitate the rotation of the inner tube 8.

The device according to the invention furthermore includes unloading means 30. Said means comprises a second tubular member 31 which is attached to said beams 3, centrally between said timber bunks 1 and 2 and parallel thereto. A second tubular member 31 has substantially the same length as the transverse member 4 of the two timber bunks 1 and 2. A sliding means 32 is arranged in said tubular member 31 for axial reciprocal movement in the same under the action of a linear prime mover such as a hydraulic jack 33. Each of the stationary stakes 7 is provided with attachment means 34 at some distance above the bottom ends of said stake and one end of an elongate flexible member, preferably a chain 35, is anchored at said attachment means 34. The outer end of said chain 35 passes through a longitudinal slot 36 in said tubular member 31 and is secured to said sliding means 32. The chain 35 has such length that it loosely hangs down from said attachment means 34 along the side of the stacked logs and loosely passes in under the same to the sliding means 32 when the same occupies the retracted position in the tubular member 31, but is tensioned to a straight, sloping position from said attachment means 34 to said sliding means 32 when the same is in its fully extended position in said tubular member 31. Since one chain 35 is provided on both sides of said tubular member 31 and extends to the attachment means 34 of each stationary stake 7, said two chains 35 in their downwardly sloping and converging condition form an inclined ramp along which the stake of logs can slide off the truck. In the tensioned condition the outer ends of said chains 35 may be aligned with the outer ends of said inner tubes 8 in their extended position.

For reasons to be explained in the following, it is convenient to arrange a hook member 37 on each of the chains 35 intermediate the ends thereof. Said hook member 37 can be coupled to a chain link of the corresponding chain 35 situated closer to the attachment means 34 thereof than the hook member itself, whereby the active length of said chain 35 is shortened when used to unload the staked timber.

Finally, the device according to the invention includes a second attachment means 40 provided on the beam 3 adjacent and inside the extendable end of each timber bunk 1 and 2. Each of said second attachment means 40 is arranged to be releasably coupled to one end of a second elongate flexible member or chain 41. When the stack of logs has been loaded between the upstanding stakes 7 and 9 of the timber bunks 1 and 2 and before the transport of the stack is commenced, said second chains 41 are passed up along the adjacent side of said stack, over the same and partly down along the opposite side thereof. The free end of each chain 41 is coupled to the hook member 37 of the corresponding first chain 35, whereafter the sliding means 34 is displaced to a partially extended position thereby to tension said second chains 41 around the stack of timber. The sliding means 34 is hydraulically or mechanically locked in said partially extended position to secure the stack of logs during transport.

The possibility to shorten the effective length of the chains 35 by means of the hook members 37 enables the location of said members 37 at such a place along the chains 35 that said members 37 when they are to be coupled to the second chains 41, are easily accessible at a suitable level in the side of the stacked logs resting against said stationary stakes 7.

The three linear prime movers or hydraulic jacks 11,11 and 33 can be connected to the hydraulic system of the truck and can be made double-acting or retractable by means of a spring. The jacks are actuated from the driver's seat and this arrangement, in connection with the fact that all manual handling of the device is performed from the side of the truck having the stationary stakes 7, eliminates the risk of personal injuries during transport and unloading of the logs.

What I claim is:

1. A device for transport of logs and the like, stacked on a support such as a timber truck, and for unloading said logs, said device comprising:
    (a) at least two timber bunks secured to said support transversely of same and longitudinally spaced from each other, each of said timber bunks including a first and a second vertically upstanding stake for retaining said stacked logs and a transverse member interconnecting the bottom ends of said stakes, said transverse member being telescopically extendable to move said second stake away from said first stake and simultaneously swing said second stake from its vertically upstanding position to a downwardly inclined position;
    (b) a second transverse member secured to said support intermediate said timber bunks and parallel thereto, said second transverse member being extendable in the same direction as the transverse members of said timber bunks, an elongate flexible member having opposite ends, one end of said elongate flexible member being anchored to each of said first stakes at a distance upwards from said support, and the other end thereof being connected to said second transverse member for substantially horizontal movement upon extension and retraction thereof, said flexible member having loose and tightened conditions and having such length as to extend in loose condition from said first end downwardly along and beneath said stacked logs when said second transverse member is retracted and to extend in a tightened condition between said ends when said second transverse member is extended, thereby forming a sloping ramp for unloading said logs from said support; and
    (c) a second flexible member having opposite ends, connecting means provided on said support adjacent and inside the extendable end of each timber bunk for releasably securing one end of said second elongate flexible member extending therefrom upwardly over said stacked logs and having its other end releasably coupled to a corresponding one of the first said flexible member intermediate the ends thereof, so that said second flexible member can be tightened around said stacked logs by partial extension of said second transverse member.

2. A device as claimed in claim 1, wherein the transverse member of each timber bunk comprises an outer tube and an inner tube, said inner tube being axially displaceable and turnable within said outer tube by means of a linear prime mover which interconnects said tubes and is accommodated in said outer tube, a radial stud on said inner tube being guided on a slot of said outer tube, said slot having an axial inner portion and a helical outer portion extending over more than 90° but less than 180° of the periphery of said outer tube.

3. A device as claimed in claim 2, wherein said prime mover comprises a hydraulic jack including a cylinder fixed in said outer tube and a piston and piston rod coupled to said inner tube, said piston and piston rod being both axially displaceable and turnable within said cylinder.

4. A device as claimed in claim 2, wherein a locking means is provided to lock said inner tube to said outer tube in the retracted position, said locking means being automatically released upon axial displacement of said inner tube from said retracted position.

5. A device as claimed in claim 4, wherein said locking means comprises an axial leaf spring whose inner end is secured to the outside of said outer tube and whose outer end is provided with a latch bolt for engagement in openings in said outer and inner tubes when said openings are aligned in said retracted position, a release bolt being arranged in an opening of said outer tube intermediate the ends of said leaf spring, the release bolt being radially displaceable by means of a cam surface provided at the end of the piston rod of said hydraulic jack upon extension of same in order to bend said leaf spring and lift said latch bolt out of said aligned openings.

6. A device as claimed in claim 1, wherein said second transverse member comprises a tube and a sliding means axially displaceable in said tube by means of a linear prime mover, slide means being provided by axially extending slots in said tube, the other end of the first said flexible member passing through said slots and being connected to said sliding means.

7. A device as claimed in claim 6, wherein said linear prime mover is a hydraulic jack.

8. A device as claimed in claim 1, wherein said first and said second flexible members are chains, and a hook member is provided on said first flexible members intermediate the ends thereof, which hook members may be selectively coupled to the corresponding end of said second flexible member and to its own flexible member between itself and the first anchored end thereof in order to reduce the active length of said first flexible member when used to unload said logs.

9. A device for transport of elongate objects such as logs stacked on a support, for instance on a timber truck, and for unloading said objects, said device comprising:
    (a) at least two timber bunks longitudinally spaced on said support across the same and each consisting of:
        (i) a first elongate hollow member such as a tube rigidly secured to said support transversely thereof and at one end adjacent one side edge of said support being provided with a vertically upstanding stationary stake; and
        (ii) a second elongate member which at one end is provided with a second stake at right angles to said member, said second member being axially displaceably accommodated in said first hollow member and guided therein in such a manner that said second stake, upon displacement of said second member from a retracted position to an extended position, is swung from said vertically upstanding position to a downwardly inclined position, and vice versa;
    (b) a third elongate, hollow member which is secured to said support intermediate said first elongate members in parallel relationship thereto and which houses axially displaceable sliding means connected to one end of two elongate flexible members, the other ends of which are anchored on each of said first stakes at a distance above said support, the lengths of said flexible members being such that said members are adapted to loosely pass under said stacked logs in a retracted position of said sliding means and are tightened in an extended position of said means to form a sloping unloading ramp for said logs;
    (c) connecting means provided on said support adjacent and inside the stake free ends of each of said first hollow members; and (d) a second elongate flexible member being arranged to extend over the stacked logs and to have its opposite ends releasably coupled to each one of said connecting means and to each of said first flexible members intermediate the ends thereof, so that said second flexible member can be tightened around said stacked logs by axial displacement of said sliding means to a partially extended position.

* * * * *